Figure 1:
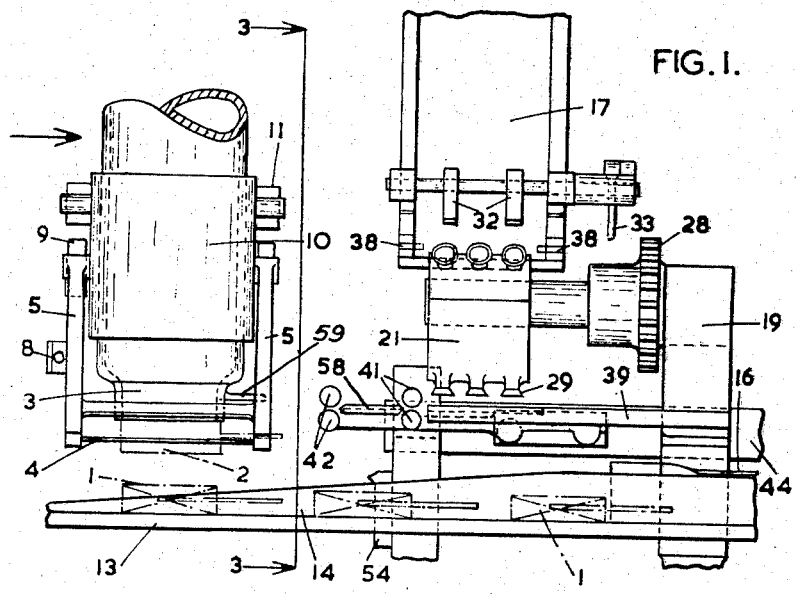

Feb. 24, 1959     J. A. GILBERT ET AL     2,875,069
METHOD OF MANUFACTURING WRAPPED PACKAGES
OF EDIBLE PLASTIC MATERIAL
Filed May 5, 1955     2 Sheets-Sheet 1

INVENTORS
JOSEPH A. GILBERT
REGINALD F. JOHNSON
ALFRED G. ROSE
By Semmes & Semmes
Attorneys

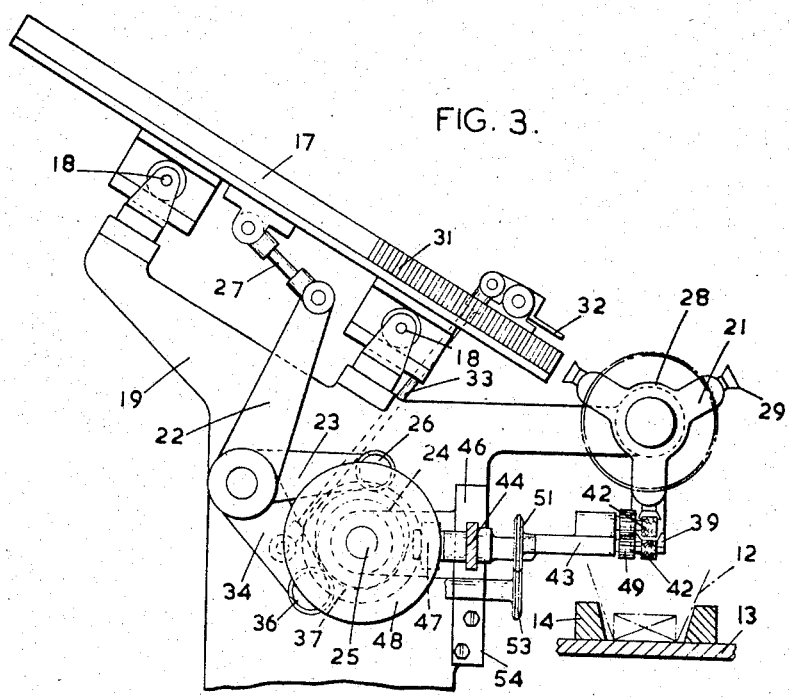
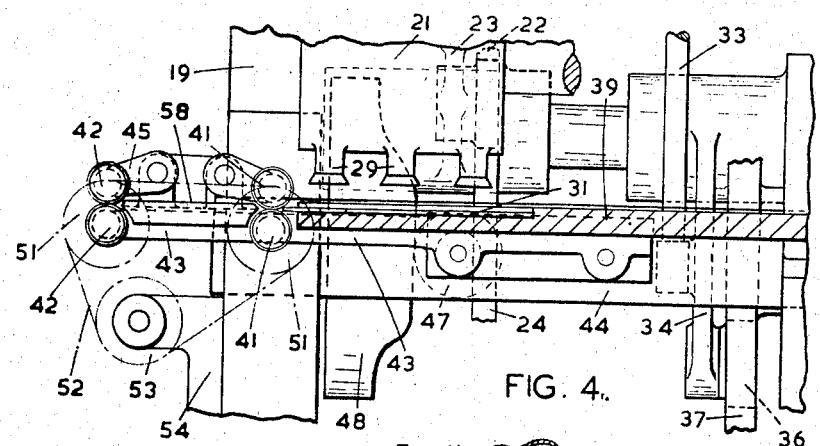
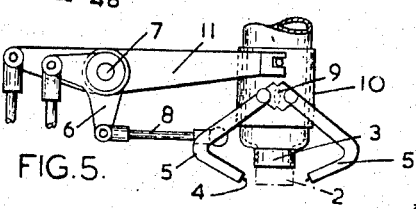

United States Patent Office 2,875,069
Patented Feb. 24, 1959

2,875,069

METHOD OF MANUFACTURING WRAPPED PACKAGES OF EDIBLE PLASTIC MATERIAL

Joseph Arthur Gilbert, Reginald Frank Johnson, and Alfred German Rose, Gainsborough, England, assignors to Rose Brothers (Gainsborough Limited), Gainsborough, England, a British company Application May 5, 1955, Serial No. 506,178

Claims priority, application Great Britain May 25, 1954

7 Claims. (Cl. 99—171)

This invention relates to the manufacture of wrapped packages each containing an article of ice-cream or other plastic edible material, e. g., toffee, by the method (hereinafter referred to as the "described method") in which a spaced succession of articles are fed on to a movable web of wrapping material, e. g., paper, film, foil or other material, which is folded around the spaced succession of articles in the form of a continuous tube, the tube being collapsed and secured between each article so that each article is completely enclosed. The continuous succession of packages thus formed may then be separated by cutting across the collapsed portion. The invention is concerned with the manufacture of packages of the above kind, in which there is inserted into each article a stick of wood, stiff cardboard or other material (referred to herein as "sticks") for the purpose of handling the article.

According to the present invention, wrapped packages are formed by the described method, comprising forming the articles from a strip of the plastic material which is continuously extruded towards the web and severed at intervals in timed relationship with the movement of the web so as to deposit thereon a continuous succession of articles, and inserting a stick laterally into the extruding strip before the severing of the strip to form each article, the complete articles then being deposited on the web. In this manner, packages are formed each containing an article with an inserted stick, the whole article being completely enclosed in the wrapping material.

The extruding and wrapping operations may be substantially as described in British Patent Specification No. 743,978, and as explained in this application, the strip may be severed by a pair of opposed knives or wires arranged to travel during the cutting operation in the direction of extrusion and at substantially the same rate. Similarly, the sticks may be arranged to travel in the direction of extrusion during the inserting movement, though for very soft materials, such as ice-cream it is found that such movement of the sticks may be dispensed with.

The movement of the web is preferably continuous, though the web may be driven intermittently if desired to allow the block being fed to meet the web when there is substantially no relative movement between the web and the block. It is found, however, that the spacing of the blocks remains sufficiently accurate with a continuously moving web, to allow proper completion of the packages.

The invention has been found very useful in relation to the formation of articles from ice-cream, the insertion of the sticks into the relatively soft extruding mass being a simple operation.

The ice-cream may, of course, be of single or multiple flavour, and the cross-sectional shape of the extruded strip may be varied to produce articles of different shape. Thus, it may be rectangular, or it may have straight ends and tapering sides, or one end, i. e., the end opposite the stick, rounded. Again, the cross-section may be in the shape of an animal or other figure.

Figure 2:
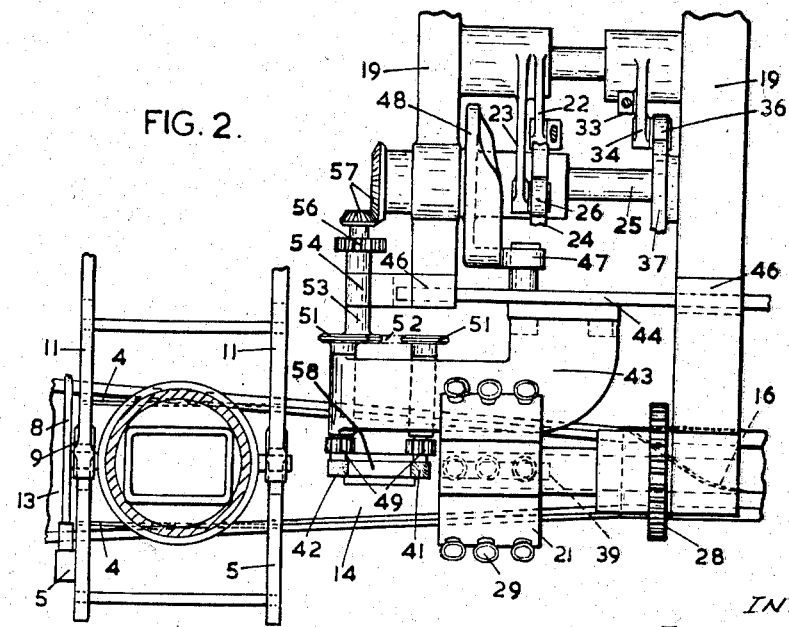

The invention will now be described in greater detail with reference to the accompanying drawings, in which:

Figure 1 is an elevation of part of a block-forming and wrapping machine for ice-cream blocks with inserted sticks, Figure 2 is a plan of the apparatus shown in Figure 1 with part of the upper structure removed, Figure 3 is a sectional view taken on the line 3—3 in Figure 1, Figure 4 is a detail of Figures 1 to 3, drawn to a larger scale, and Figure 5 is a view of part of the apparatus of Figure 1, drawn to a smaller scale and viewed in the direction of the arrow in Figure 1.

Blocks 1 are cut in succession from a continuous strip 2 of ice-cream extruding from a nozzle 3 by a pair of cutting wires 4 carried on pivoted arms 5, the latter being pivoted by a cam-operated arm 6 freely mounted on a stationary pivot 7 and connected to one of the arms 5 by a link 8. The arms 5 are connected by racks 9. The arms 5 are mounted on a barrel 10 itself slidably mounted on the nozzle 3 and reciprocated by a cam-operated arm 11 freely mounted on the pivot 7 and having a pin and slot connection with the barrel 10. The rate of operation of the arm 11 is such as to cause the wires 4 to move, during the cutting action, at substantially the same rate as that of extrusion of the strip 2.

The severed blocks 1 are deposited in spaced succession on to a continuously travelling web 12 of wrapping material arranged to be drawn over a supporting platform 13, through a guiding channel 14, serving to fold the web into U-shape, and then through folding ploughs 16 (one only shown) serving to fold over the upstanding portions of the web 12 on to the blocks 1 in the form of a continuous tube with a longitudinal seam. The tube is then collapsed and secured between successive blocks 1 to form a continuous succession of packages which are finally separated by severing the collapsed portions. These wrapping operations are described in more detail in the specification mentioned above to which reference may be made.

Arranged adjacent the nozzle 3 is a stick-inserting mechanism having a stick magazine 17 slidably mounted on rollers 18 supported in a framework 19, the magazine 17 being movable towards and away from a suction device 21 by a two-armed lever 22, 23 arranged to be rocked by a rotatable cam 24, secured to a main shaft 25, engaging a roller 26 on the arm 23, the arm 22 being connected to the base of the magazine 17 by a link 27.

The suction device 21 is arranged to be driven intermittently through a gear 28 driven by a Geneva mechanism (not shown), to carry suction nozzles 29 in succession into register with the mouth of the magazine 17 so as each to receive a stick 31 from the magazine. The arm 23 is spring-urged against the cam 24 to provide the forward movement, engagement between the stick 31 and the nozzle 29 thus being resilient. A trapping member 32 is oscillated in timed relationship with the movement of the magazine 17 to move into engagement with the stack of sticks 31 (while leaving the leading stick free) to prevent movement of the stack in the magazine upon suction engagement of the nozzle 29. The trapping member 32 is resiliently rocked by a link 33 attached to an arm 34 carrying a roller 36 arranged to engage a cam 37 secured to the shaft 25, the arm 34 being spring-urged towards the cam 37.

At each movement of the suction device 21, therefore, a stick 31 is withdrawn from the magazine 17, against the action of retaining springs 38, and carried into register with a stationary forwarding channel 39 into which the stick is deposited upon suction being cut-off. The leading end of the stick 31 protrudes from the forward end of the channel 39 to be gripped by the first of two pairs of knurled forwarding rollers 41 and 42 rotatably mounted in arms 45 pivoted on a carriage 43 secured to a slide bar 44 mounted for reciprocation in a slideway 46 formed in the framework 19. The arms 45 are spring-urged towards the lower rollers to provide a resilient nip. The slide bar 44 carries a roller 47 arranged to engage a rotatable cam 48 secured to the shaft 25, the bar 44 being spring-urged towards the cam.

The rollers 41 and 42 are connected by gears 49, the lower gears 49 being driven by sprockets 51 connected by a chain 52 to a drive sprocket 53 rotatably mounted in a bearing bracket 54 carried by the framework 19. The sprocket 53 is driven by gearing 56, 57 from the main shaft 25. Upon reciprocation of the carriage 43, the chain 52 rolls round the sprocket 53 to maintain rotation of the rollers 41 and 42.

As each stick 31 is deposited in the channel 39, the carriage 43 moves to carry the rollers 41 up to the mouth of the channel to nip the protruding end of the stick and forward it along a supporting channel 58, between the rollers 41 and 42, to the nip of the rollers 42. At some time after the nipping of the stick by the rollers 41, the carriage 43 is moved in the opposite direction, i. e., towards the extruding strip 2, so that the combined movements of the rollers 42 and the carriage 43 serve to drive the stick into the extruding strip 2 through a suitable aperture in the nozzle 3, a guide 59 being provided on the nozzle 3 to prevent any tendency to upward movement of the stick 31 as it is inserted into the strip 2.

Because of the resilient nip provided between the rollers 42, the forward drive of the stick 31 continues some little distance beyond the centre line of the rollers. This facilitates clearance between the trailing end of the stick (during continuous extrusion of the strip 2) and the forward roller surfaces during retracting movement of the carriage 43, the latter being given a quick movement at the start of the retraction by the cam 48.

The strip 2, with the stick inserted in this manner, continues to extrude until the desired thickness of the block has passed clear of the mouth of the nozzle 3, whereupon the cutting wires 4 operate to sever the block 1 which then drops on to the moving paper web 12 as explained above. During this time, of course, the carriage 43 has collected a further stick 31 for insertion into the extruding strip 2 for the production of the next block.

We claim:

1. Method of manufacturing wrapped packages each containing an article of plastic edible material in which method a spaced succession of articles are fed on to a movable web of wrapping material, said method being characterised by the steps of continuously extruding a strip of the plastic material towards a movable web of wrapping material, forming a succession of articles by cutting the extruding strip at intervals in timed relationship with the movement of the web so as to deposit thereon a spaced succession of the articles, said cutting being such as to avoid interference with the extruding movement and being by means of a cutting device concurrently moving (1) with the strip during the cutting action at substantially the same rate as that of extrusion of the strip and (2) transversely of the strip to cut the strip; and, prior to the cutting of the strip to form each article, inserting a stick laterally into the extruding strip.

2. Method as in claim 1, wherein the web is moved continuously.

3. In a wrapping apparatus of the kind in which a spaced succession of articles are fed on to a movable web of wrapping material which is then folded around the spaced succession in the form of a continuous tube, the tube then being collapsed and secured between each article so as to enclose it completely, the provision of means for continuously extruding a strip of the plastic material towards the web, a stick feeding device adapted to insert sticks in succession laterally into the leading portion of the extruding strip; a cutting device adapted to sever the extruding strip after each stick-inserting operation to form and deposit in spaced relationship on the web a succession of articles each with an inserted stick, means for concurrently moving the cutting device (1) with the strip, during the cutting action, at substantially the same rate as that of extrusion of the strip and (2) transversely of the strip to cut the strip.

4. Apparatus as in claim 3, wherein the stick-inserting means comprises at least one pair of forwarding rollers rotatably mounted in a carriage movable in a direction transverse to that of extrusion of the strip and adapted to receive sticks in succession, and means for rotating the rollers in the carriage.

5. Apparatus as in claim 4, wherein the upper roller of said pair of rollers is spring-urged towards the corresponding lower roller.

6. Apparatus as in claim 5, comprising a magazine for containing a stack of sticks, a stationary channel, means for withdrawing the sticks in succession from the magazine and depositing them in the channel, the sticks being seized in succession from the channel by the forwarding rollers.

7. Apparatus as in claim 4, comprising a magazine for containing a stack of sticks, a stationary channel, means for withdrawing the sticks in succession from the magazine and depositing them in the channel, the sticks being seized in succession from the channel by the forwarding rollers.

References Cited in the file of this patent

UNITED STATES PATENTS

| Number | Name | Date |
|---|---|---|
| 1,486,748 | Hilgers | Mar. 11, 1924 |
| 1,810,864 | Vogt | June 16, 1931 |
| 2,094,769 | Anderson | Oct. 5, 1937 |
| 2,152,214 | Sattler | Mar. 28, 1939 |
| 2,488,046 | Werner et al. | Nov. 15, 1949 |
| 2,600,216 | Denison | June 10, 1952 |
| 2,625,776 | Brandenberger | Jan. 20, 1953 |
| 2,629,346 | Johansen | Feb. 24, 1953 |
| 2,637,281 | Latini et al. | May 5, 1953 |
| 2,705,857 | Fox et al. | Apr. 12, 1955 |
| 2,735,378 | Vogt | Feb. 21, 1956 |
| 2,739,545 | Nelson | Mar. 27, 1956 |